US 6,574,690 B1

(12) United States Patent
Fairbanks et al.

(10) Patent No.: US 6,574,690 B1
(45) Date of Patent: Jun. 3, 2003

(54) ASYNCHRONOUS PULSE BIFURCATOR CIRCUIT WITH A BIFURCATION PATH COUPLED TO CONTROL FIFO AND FIRST AND SECOND SUBORDINATE FIFO

(75) Inventors: Scott M. Fairbanks, Mountain View, CA (US); Charles E. Molnar, deceased, late of Sunnyvale, CA (US), by Donna A. Molnar, executrix (73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/474,342

(22) Filed: Dec. 29, 1999

(51) Int. Cl.[7] .............................. G06F 13/00; H03K 1/04
(52) U.S. Cl. .............................. 710/57; 710/52; 710/53; 710/58; 710/305; 712/200; 712/220; 326/21; 326/49; 326/40; 327/153; 327/292
(58) Field of Search .......................... 710/305, 52, 58, 710/53, 57; 326/49, 21, 40; 712/200, 220; 327/153, 292

(56) References Cited

U.S. PATENT DOCUMENTS

| | | | |
|---|---|---|---|
| 5,742,182 A | 4/1998 | Sutherland | 326/49 |
| 5,838,933 A | 11/1998 | Molnar et al. | 710/305 |
| 5,937,177 A | 8/1999 | Molnar et al. | 712/200 |
| 6,069,514 A | * 5/2000 | Fairbanks | 327/153 |
| 6,292,017 B1 | * 9/2001 | Rangasayee | 326/40 |

OTHER PUBLICATIONS

Coates et al., "A FIFO Data Switch Design Experiment," IEEE, pp. 4–17 (Sep., 1998).

* cited by examiner

Primary Examiner—Jeffrey Gaffin
Assistant Examiner—Tammara Peyton
(74) Attorney, Agent, or Firm—Philip H. Albert; Townsend and Townsend and Crew LLP (57) ABSTRACT

A bifurcation circuit uses dynamic asP* protocol. to exchange data among three or more FIFOs. Each FIFO contains a plurality of places containing data and a plurality of paths that exchange data between neighboring places. The bifurcator circuit generally comprises a control FIFO, two subordinate FIFOs and a bifurcation path coupled to all three FIFOs. The bifurcator circuit further comprises a chain of data latches coupled to all three FIFOs at the bifurcation path. A data value carried in the control FIFO determines which of the subordinate FIFOs exchanges data with the control FIFO. Each place in the FIFOs contains a set reset flip-flop in which the state of each place is held by a single wire and stabilized by a keeper. A single transistor sets or resets the state of the place. The pulse that changes the state of the control flip-flops also makes the data latches momentarily transparent. The bifurcator circuit is generally capable of a branch or join operations. Alternatively, the bifurcation circuit may be implemented as a dedicated branch or join circuit. The circuits exhibit simple design, low power consumption low transistor count and easy integration into existing applications.

18 Claims, 10 Drawing Sheets

ASYNCHRONOUS PULSE BIFURCATOR CIRCUIT WITH A BIFURCATION PATH COUPLED TO CONTROL FIFO AND FIRST AND SECOND SUBORDINATE FIFO

FIELD OF THE INVENTION

This invention relates to logic circuits and in particular to an improved bifurcation circuit for use with event logic circuits and combinatorial logic.

BACKGROUND OF THE INVENTION

FIFO pipelines are widely used in the computer, telecommunication, and related fields to handle data elements. A FIFO pipeline includes N stages where N is two or more. Data elements enter at one end of the pipeline, and in a succession of steps, progress from one stage to the next. Eventually, the data elements exit the pipeline at the last or Nth stage, in the same order in which the data elements entered the FIFO (i.e., first-in first-out). FIFOs may be either synchronous or asynchronous. In a synchronous FIFO, the stages operate within a rhythm imposed from an outside source, such as a clock. Each task that is performed at a particular stage must be completed within the clock period. With asynchronous FIFOs, each stage operates at its own pace.

The general functionality of asynchronous FIFOs is well known. See, for example, U.S. Pat. No. 5,838,933, issued to Molnar et al. and assigned to the assignee of the present application, which is incorporated herein by reference for all purposes.

Figure 1:
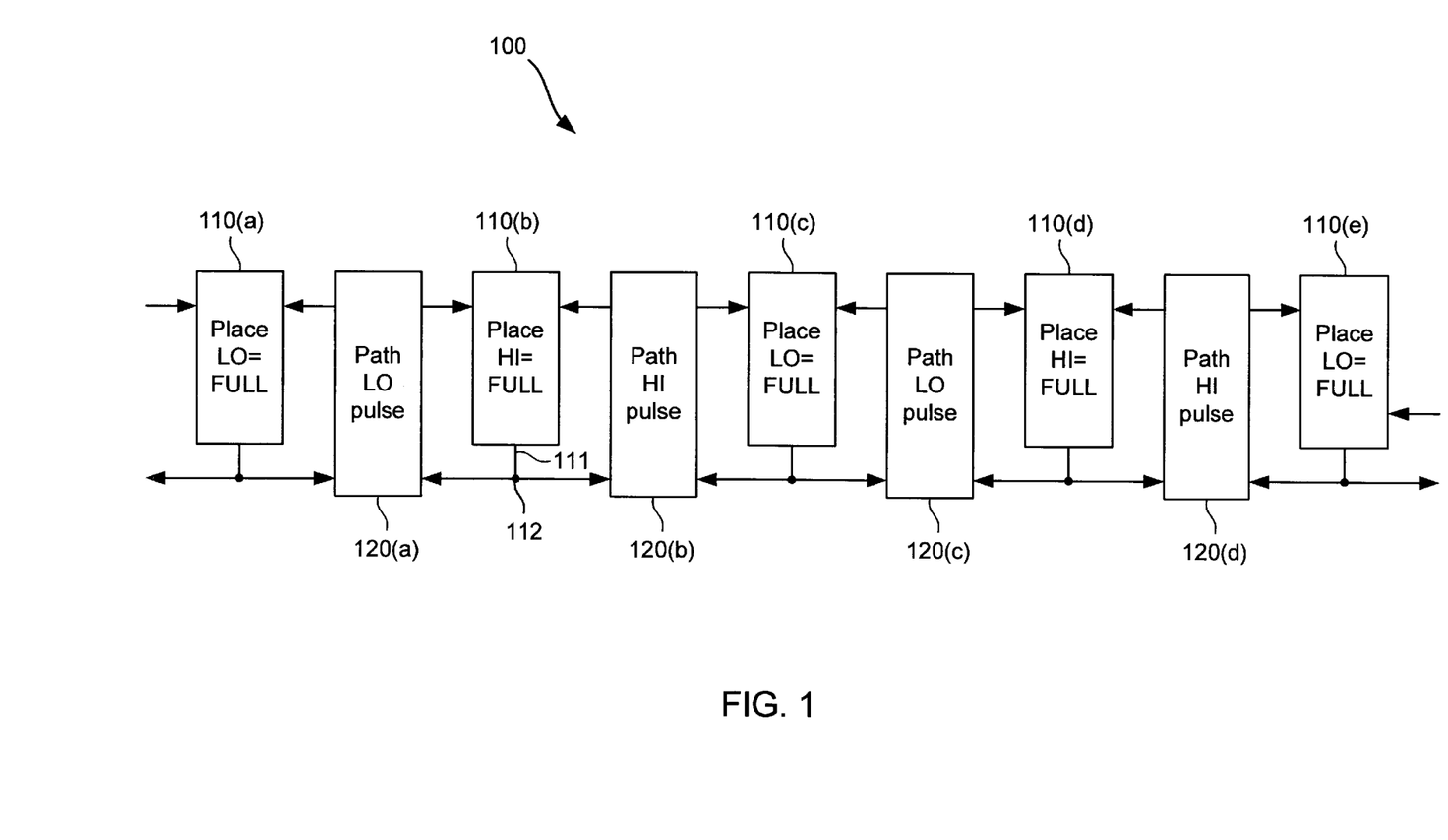
FIG. 1 is a block diagram of a dynamic asP* FIFO circuit of the prior art.

One event driven FIFO circuit is known as an Asynchronous Symmetric Persistent Pulse Protocol (asP*) FIFO. Such a FIFO is depicted in FIG. 1. The FIFO 100 can be thought of as a sequence of "places" 110(a)–(e) joined by "paths" 120(a)–(d). Each place 110 has a predecessor path and a successor path. Similarly, each path 120 has a predecessor place and a successor place. For example, place 110(b) has predecessor path 120(a) and successor path 120(b). Path 120(a) has predecessor place 110(a) and successor place 110(b). Places 110(a)–(e) and paths 120(a)–(d) follow simple rules. Each place 110(a)–(e) as two states, FULL and EMPTY. Each place 110(a)–(e) reports its state to its predecessor and successor paths. Each path 120(a)–(d) acts when it detects that its predecessor place is FULL and its successor place is EMPTY. When a path, such as path 120(a), acts, it transmits the data from its predecessor place to its successor place and changes the states of both places, i.e., place 110(a) becomes EMPTY and place 110(b) becomes FULL.

One can think of the places 110 as having a data part and a control part. The data part holds the data value copied from the previous place. The control part contains the state FULL or EMPTY. The control part acts like a "set-reset" (SR) latch or flip-flop. The paths on either side of a given place drive the set and reset inputs of the control flip-flop to cause the place to become FULL or EMPTY as the protocol demands.

In a pseudo-dynamic asP* protocol, the state of a place, such as 110(b) is represented by the charge (or voltage) on a wire 111 connected to paths 120(a) and 120(b). A small "keeper" 112, typically just a pair of cross-tied inverters, retains the charge on wire 111 when it is not otherwise driven. The electrical capacitance of the wire 111 and the drive of the keeper 112 together form a control flip-flop.

In a dynamic asP* FIFO, such as that illustrated in FIG. 1, the places 110(a)–(e) alternate in type. This alternation arranges the meaning of the HI and LO states of the control flip-flops in the places 110 to simplify the circuits in the paths 120 as much as possible. In some places, such as place 110(b) a HI keeper voltage means FULL, but in others, such as place 110(c), a LO keeper voltage means FULL. Because the places 110(a)–(e) alternate in type paths, 120(a)–(d) will detect the FULL-EMPTY condition as either two HI signals or two LO signals, depending on where the path is in the sequence. There are also two types of paths, one like path 120(b) responding to a HI—HI condition of its adjacent places, the other like path 120(c) responding to LO—LO. When a path detects that it should act, it creates a pulse on its output. The pulse transmits the data forward to the successor place and toggles the control state in both the successor and predecessor places. One type of path produces a HI pulse when it acts, the other a LO. These pulses are of the right sense to toggle the control state of the adjacent places appropriately.

Several logic operations that commonly employ FIFO circuits. One such operation is a "bifurcation". A bifurcation describes both the branching of one stream of data elements into two streams and the joining of two streams of data elements into one stream. Since branch and join operations are very similar, the term bifurcation was coined to cover both.

As with many circuits employing FIFOs not previously introduced, speed and chip area are at a premium.

SUMMARY OF THE INVENTION

This invention provides an improved bifurcation circuit, for high-speed and low component count uses as well as improvements in speed and chip area usage. The various embodiments of the present invention provide bifurcation circuits employing a dynamic asP* protocol. The bifurcator circuit generally employs return to zero logic. The bifurcator circuit generally comprises an asynchronous pulse (asP*) control FIFO containing a plurality of places and paths, two subordinate asP* FIFOs, and a bifurcation path coupled to all three FIFOs. The bifurcator circuit further comprises a chain of data latches coupled to all three FIFOs at the bifurcation path. A control value carried in the control FIFO determines which of the subordinate FIFOs exchanges data with the control FIFO. The bifurcation path moves the data value from a predecessor place to a successor place when the predecessor place is FULL and the successor place is EMPTY.

There are three key parts of the dynamic asP* implementation of the bifurcator circuits described here. First, each place in the asynchronous FIFOs in the bifurcator circuits contains a set reset flip-flop in which the state of each place is held by a single wire and stabilized by a small keeper. Second, a single N-type or P-type transistor sets or resets the state of the place. Thus the last of the logic gates in the minimum loop is a single transistor and not a complete gate. This makes the circuit operate very much faster than the earlier asP* implementations. Third, the same pulse that changes the state of the control flip-flops also makes the data latches momentarily transparent. Previous asP* designs have mainly used the state of the control flip-flops to condition the data latches.

The bifurcator circuit is generally capable of a branch operation wherein, depending upon the control value, the bifurcation path moves the data value from a predecessor place in the control FIFO to a successor place is one of the two subordinate FIFOs. Similarly, the bifurcator circuit of the present invention is capable of a join operation wherein the bifurcation path moves a data value from a predecessor place in one of the two subordinate FIFOs to a successor place in the control FIFO depending on the data value. Alternative embodiments of the bifurcator circuit are implemented as either branch or join circuits In the circuits of the various embodiments of the present invention, each of the places generally contains a keeper coupled at a node to an N-type transistor and a P-type transistor. Each of the paths generally includes a NAND gate coupled to an inverter. Each of the data latches generally includes a pair of transistors coupled to a keeper. The output of the path is coupled a gate electrode of at least one of the transistors in the place. The path produces an output pulse that resets the state of the place. The same output pulse is also coupled to the transistors in a data latch to move the data to the next latch in the chain.

The bifurcator circuits described herein provide for rapidly branching or joining of data streams depending on the binary values of data and control signals. Such circuits exhibit simple design, low power consumption low transistor count and easy integration into existing applications.

DESCRIPTION OF THE SPECIFIC EMBODIMENTS

In the figures, like elements are labeled with like numbers and different instances of like elements are labeled with like numbers and different parenthetical numbers or letters. Herein, the following terminology is used: a "node" is an input into, or an output from, a circuit. A "pulse generator" is a device that initiates an action that will de-assert its output sometime after that output has been asserted. In the following description, the basic FIFO circuit is described first with respect to FIG. 2. A bifurcator circuit (FIG. 3) is then built from the elements of the basic FIFO circuit of FIG. 2.

Figure 2:
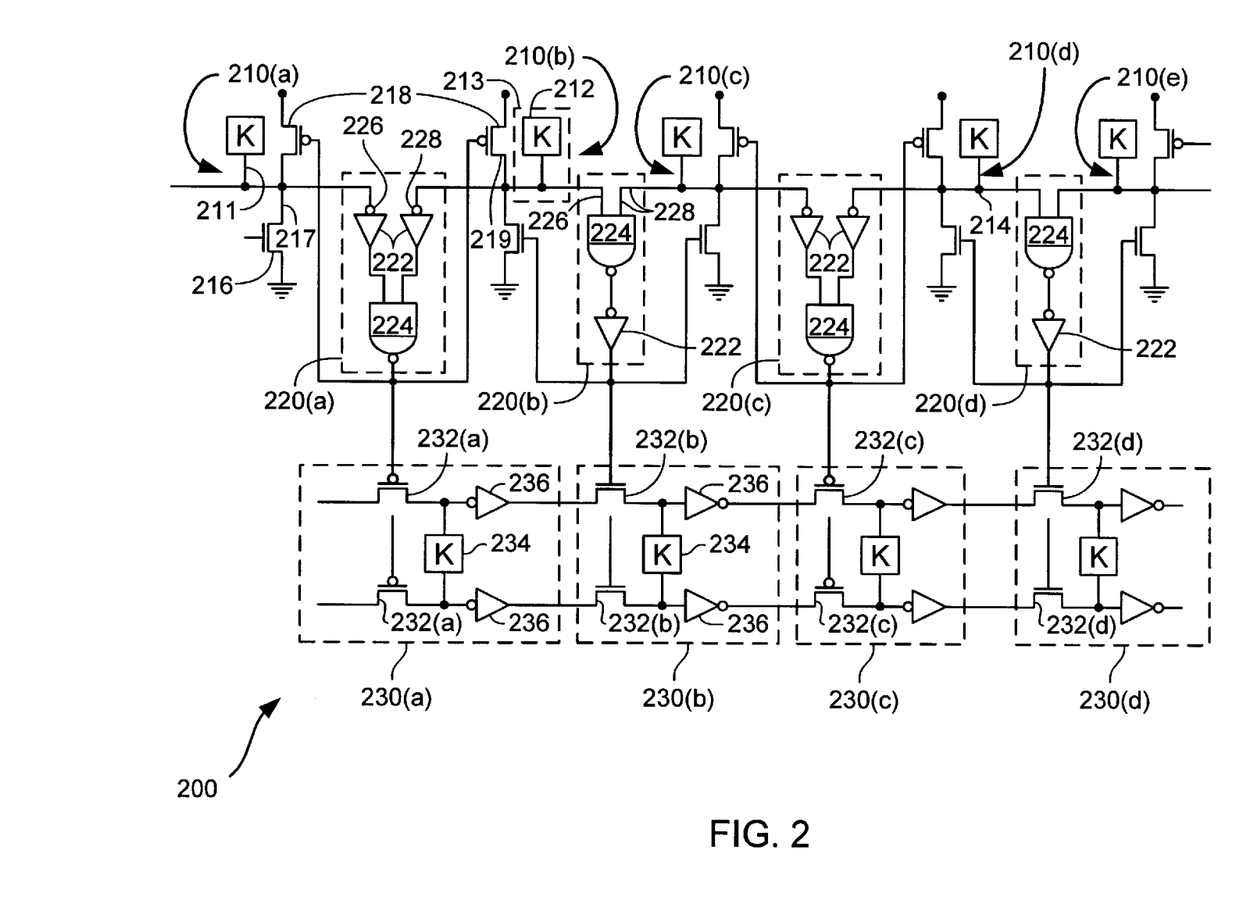
FIG. 2 is a schematic diagram of a FIFO circuit.

FIG. 2 depicts a schematic diagram of portion of a dynamic asP* FIFO. Asynchronous FIFOs of the type shown in FIG. 2 are described in greater detail in commonly assigned U.S. patent application Ser. No. 08/720,755 which names the same inventors as the present application. The FIFO 200 includes places 210(a)–(e), paths 220(a)–(d) and data latches 230(a)–(d). A wire 211 is connected to a keeper 212 (identified by a box with a "K") and a node 214 which is, in turn coupled to preceding and succeeding paths such as 220(a), 220(b). In this embodiment, a place such as place 210(b) is just the capacitance of wire 211. The charge, and therefore the voltage, on wire 211 represents the state of place 210(b), EMPTY or FULL. Keeper 212 is, for example, a pair of cross-coupled inverters. Keeper 212 retains the charge on wire 211 when wire 211 is not otherwise driven. The electrical capacitance of the wire 211 and the drive of the keeper 212 together form a control flip-flop 213.

Each place 210(a)–210(e) is also coupled at a node 214 to a drain 217 of an N-type transistor 216 and a drain 219 of a P-type transistor 218. Transistors 216 and 218 change the state of the place in response to pulses from the paths. N-type transistor 216 and P-type transistor 218 also drive keeper 212 and thus, control the set and reset functions respectively of control flip-flop 213. Note that pulses generated by paths 220(a), 220(b) also drive data latches 230(a), 230(b).

There are two types of path in FIFO 200: P-type paths 220(a), (c) and N-type paths 220(b),(d). Each type of path 220(a), (c) and 220(b), (d) has two inputs 226, 228. Input 226 is connected to the node 214 of the predecessor place. Input 228 is connected to the node 214 of the successor place. P-type paths 220(a), (c) have two inverters 222, connected to the inputs of NAND gate 224. N-type paths 220(b), (d) have a single inverter 222 connected to the output of NAND gate 224. The P-type paths 220(a), (c) and N-type paths 220(b), (d) correspond to the LO pulse and HI pulse paths respectively of FIG. 1.

Data latches 230(a), (c), 230(b), (d) contain a pair of pass transistors 232(a), (c), 232(b), (d) followed by a latch keeper 234 and a pair of amplifying inverters 236. The latch keeper 234 retains the state of the latch when the pass transistors 232(a), 232(b) are opaque. Notice that the data latches 230(a), (c) 230(b), (d) also alternate in type; P-type data latches 230(a), (c) use P-type pass transistors 232(a), (c) and N-type data latches 230(b), (d) use N-type pass transistors 232(b). The gates of each pair of pass transistors are coupled to the output of a path such that a pulse from the path renders each data latch momentarily transparent, moving the data forward to the next data latch. The pass transistors 232(a), (c) 232(b), (d) alternate between P-type and N-type to make use of the direction of the pulse (HI or LO) from their respective path control circuits 220. Although a particular form of data latch appears in FIG. 2, those skilled in the art will recognize that any of a number of data latch types could be used.

Notice that precisely three stages of logic control the duration of the pulse produced by paths 220(a)–(d). For example, starting at the keeper 212 in the leftmost place 210(a), one goes through an inverter 222, a NAND gate 224, and P-type transistor 216 to get back to the same keeper 212. The duration of the pulse is set by the delay in these three logic gates. The pulse produced by each path 220(a)–(c), shuts itself off because there are an odd number of logic gates connecting the pulse back to the state variables that are its inputs. One could build dynamic asP* FIFO circuits with five or seven or more logic gates in these loops but generally three are chosen for fastest operation.

Dynamic asP* circuits, such as FIFO 200 of FIG. 2, are sensitive to the variability of logic delays. The pulse produced at a given path begins when the two adjacent places are respectively full and empty. The pulse ends when the first of these places responds to the pulse from the path. It is important that both adjacent places respond to the pulse from the path in approximately equal times. Similarly the pulse must be sufficiently long to render the pass gates for the data latches transparent so that the data values pass from one place to the next. Such timing constraints generally place some geometric constraints on the integrated circuits embodying the places, paths, pass gates, data latches, and other components. Delays caused, for example, by wiring capacitance's can affect the operation of the circuit. If the wiring capacitance of one place greatly exceeds that of an adjacent place, the place with the smaller capacitance responds more quickly to the pulse from the path joining the two places. Consequently, the pulse may shut off before the place with the larger capacitance has a chance to respond to the pulse.

Such problems are generally overcome by proper choice of the width of the transistors that change the state of the control flip-flop in a given place. For example, a place with a large wire capacitance generally requires wider driving transistors so that the place may respond in an amount of time similar to that for a place with a smaller wire capacitance.

Another problem arises from the alternating types of places and paths. In many applications, such as oscillator circuits, the places and paths are connected to form a "ring" element. That is, a FIFO wherein the last path is connected to the first place. It should be noted that a ring element having alternating place and path types must generally contain an even number of stages. In a circuit wherein the places alternate between the LO=FULL type and the HI=FULL type, the paths between the places alternate between the LO pulse type and the HI pulse type. If the number of stages is odd, the alternation of the element types generally does not work out properly. For example, a LO=FULL place could end up between two HI pulse paths.

Figure 3:
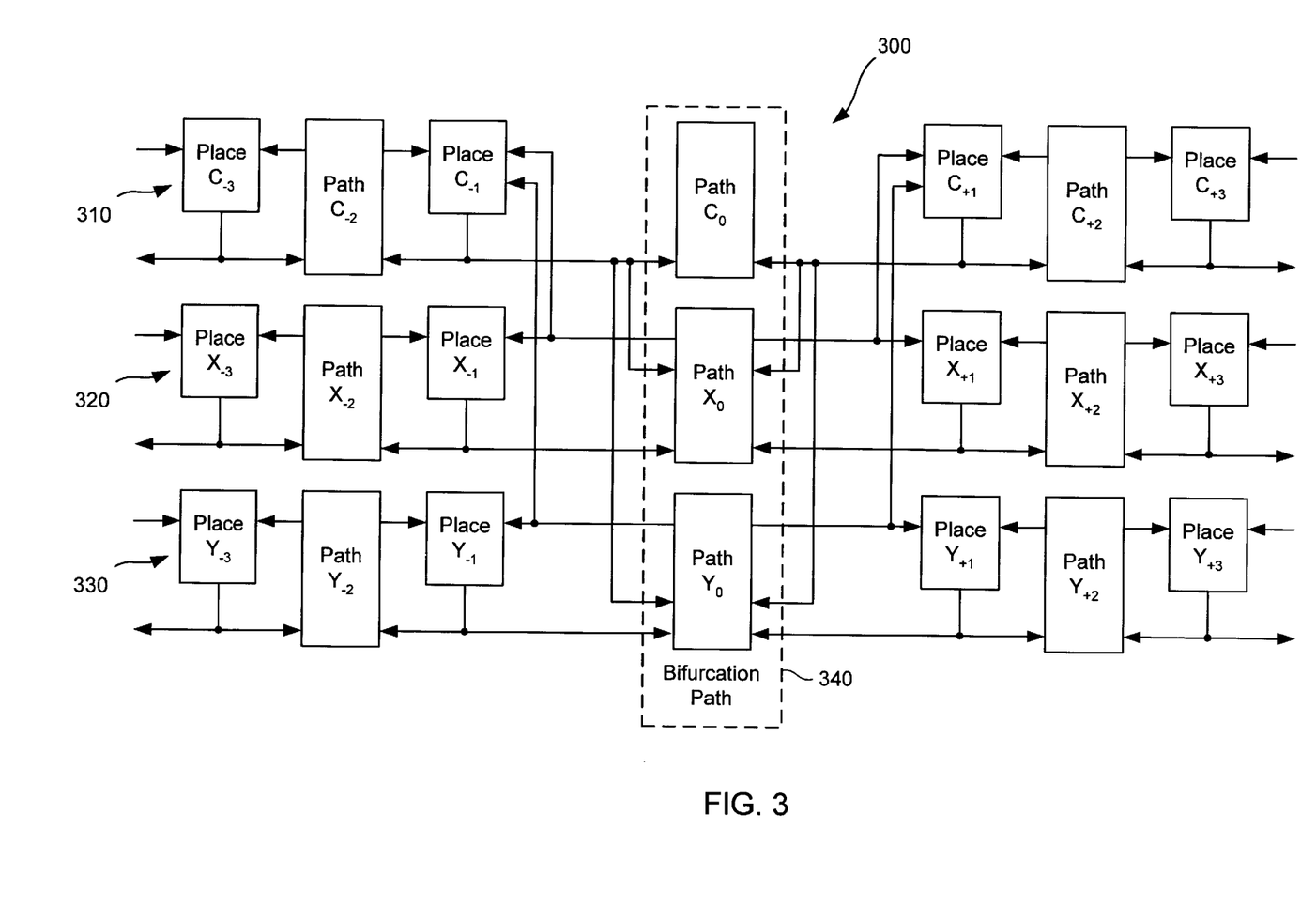
FIG. 3 is a block diagram of an embodiment according to a bifurcation circuit of the present invention.

In the various embodiments of the circuits described herein, dynamic asP* FIFO circuits of the type depicted in FIG. 2 are used as the building blocks for bifurcator circuits. In its most general form bifurcation involves the actions of three FIFOs. FIG. 3 depicts a bifurcator circuit 300 implemented with FIFOs of the type shown in FIG. 2. Bifurcator 300 comprises control FIFO "C" 310, subordinate FIFO "X" 320 and subordinate FIFO "Y" 330. The places and paths for FIFOs C, X and Y are indicated with subscripts. The subscript "0" designates a bifurcation path 340, i.e., the path where the three FIFOs interact.

At the bifurcation path 340 each operation involves a concurrent action in FIFO C and in only one of FIFOs X and Y. The actions of FIFO X and FIFO Y at bifurcation stage 340 are mutually exclusive. A single bit data value carried in FIFO C will decide whether FIFO X or FIFO Y is to act. The data bit (not shown) carried by FIFO C, called the control bit, controls the action of FIFOs X and Y in the following manner. If the control bit is a "1", FIFO X must act by moving data from place $X_{-1}$ to place $X_{+1}$. If the control bit is a "0", FIFO Y must act by moving data from place $Y_{-1}$ to place $Y_{+1}$. In either case the control FIFO (FIFO C) acts by moving data from place $C_{-1}$ to Place $C_{+1}$. For path $X_0$ or $Y_0$ to decide when to act involves a logical AND function with five inputs. For example, path $X_0$ may act only when the following five conditions hold: $C_{-1}$=FULL, $C_{+1}$=EMPTY, $X_{-1}$=FULL, $X_{+1}$=EMPTY and the control bit in $C_{-1}$ is a 1. There is also an OR function with two inputs because place $C_{+1}$ and place $C_{-1}$ must respond to actions from either path $X_0$ or path $Y_0$. Although the control bit is not shown from FIG. 3, the other necessary connections appear as arrows. Notice also that although path $C_0$ appears to have no outputs, its action moves data elements not shown in this figure from place $C_{-1}$ to Place $C_{+1}$.

By suitable modification the bifurcator 300 of FIG. 3 can be implemented as either a branch or a join. For example, by removing or disabling all the places and paths in FIFOs X and Y that precede the bifurcation stage 340, bifurcator 300 becomes a branch circuit. If, instead, all the places and paths in subordinate FIFOs X and Y that follow the bifurcation stage 340 are disabled or removed, bifurcator 300 becomes a join (or merge) circuit. In either case, the operation of the circuit elements that make up the places and paths behave essentially as described with respect to FIGS. 2 and 3. For example, FIFOs X and Y generally contain data latches analogous to data latches 230(a), 230(b) shown in FIG. 2.

Figure 4:
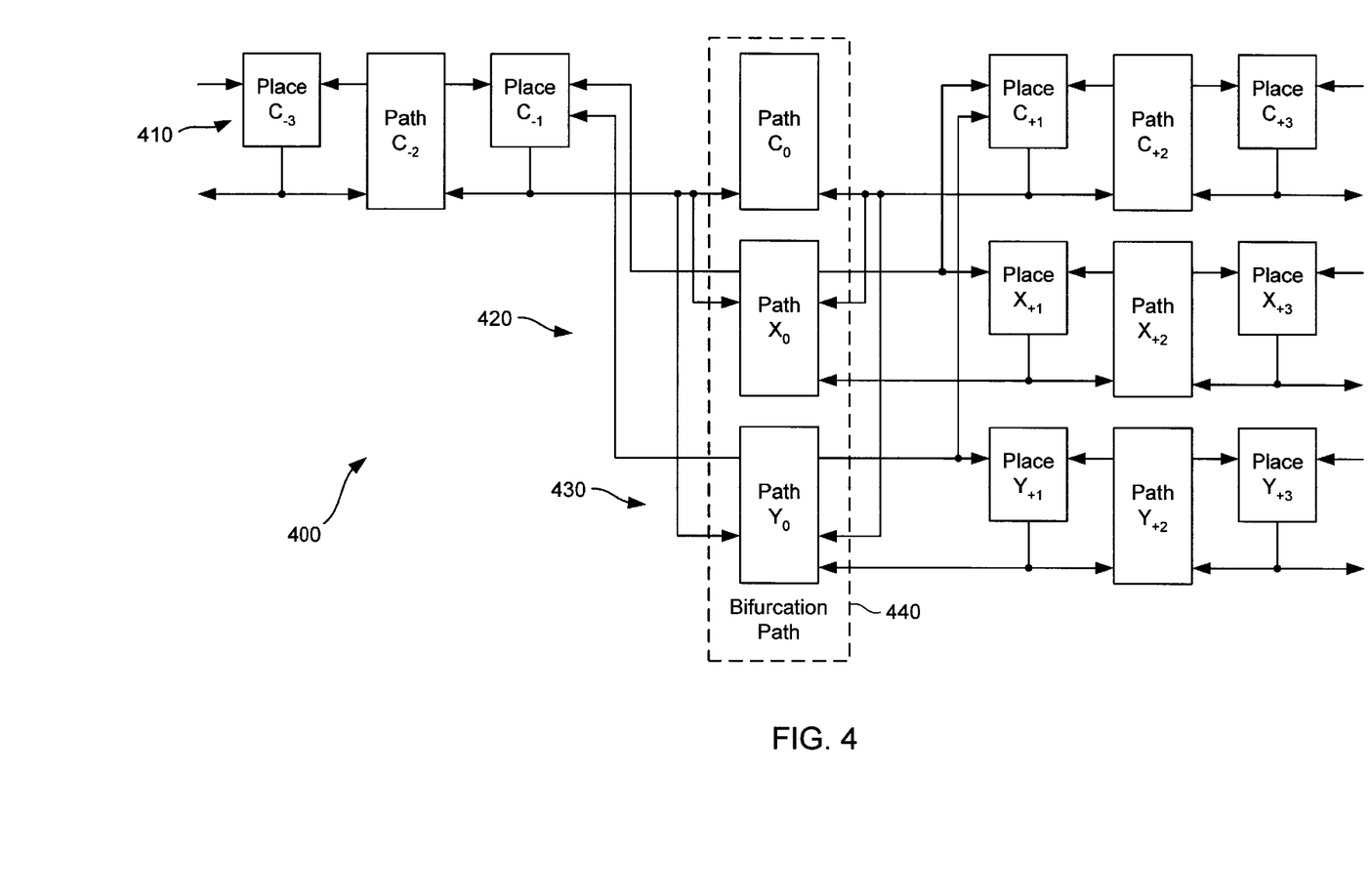
FIG. 4 is a block diagram of a branch circuit.

FIG. 4 depicts a block diagram of a branch circuit. In the branch circuit 400, two subordinate output FIFOs X 420 and Y 430 carry data delivered to them from place $C_{-1}$ of input FIFO C 410. Branching of data from FIFO C 410 into FIFOs X 420 and Y 430 occurs at a branch path 440. The AND function required of paths $X_0$ and $Y_0$ requires only four inputs, since places $X_{-1}$ and $Y_{-1}$ no longer appear.

Figure 5:
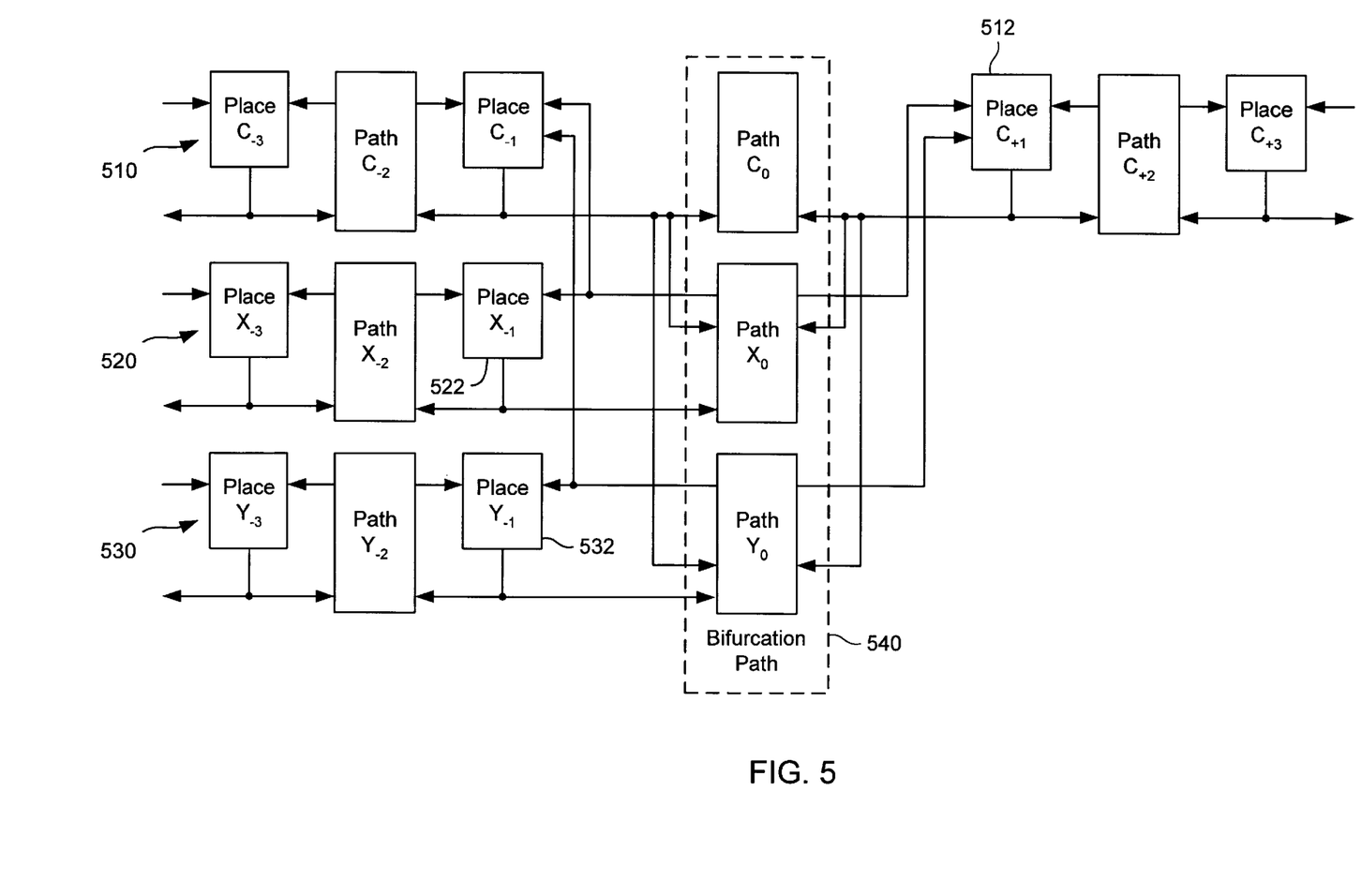
FIG. 5 is a block diagram of a join circuit.

FIG. 5 depicts a block diagram of join circuit. In the join circuit 500, data from FIFO X 520 and FIFO Y 530 are selectively joined into FIFO C 510 at a join path 540. Data coming from FIFO C 510 controls the selection of data from subordinate input FIFOs X and Y. Data from places $X_{-1}$ 522 and $Y_{-1}$ 532 are delivered to place $C_{+1}$ 512 of FIFO C 510 when paths $X_0$ and $Y_0$ act respectively. The AND function required of paths $X_0$ and $Y_0$ requires only four inputs, since places $X_{+1}$ and $Y_{+1}$ no longer appear.

Figure 6:
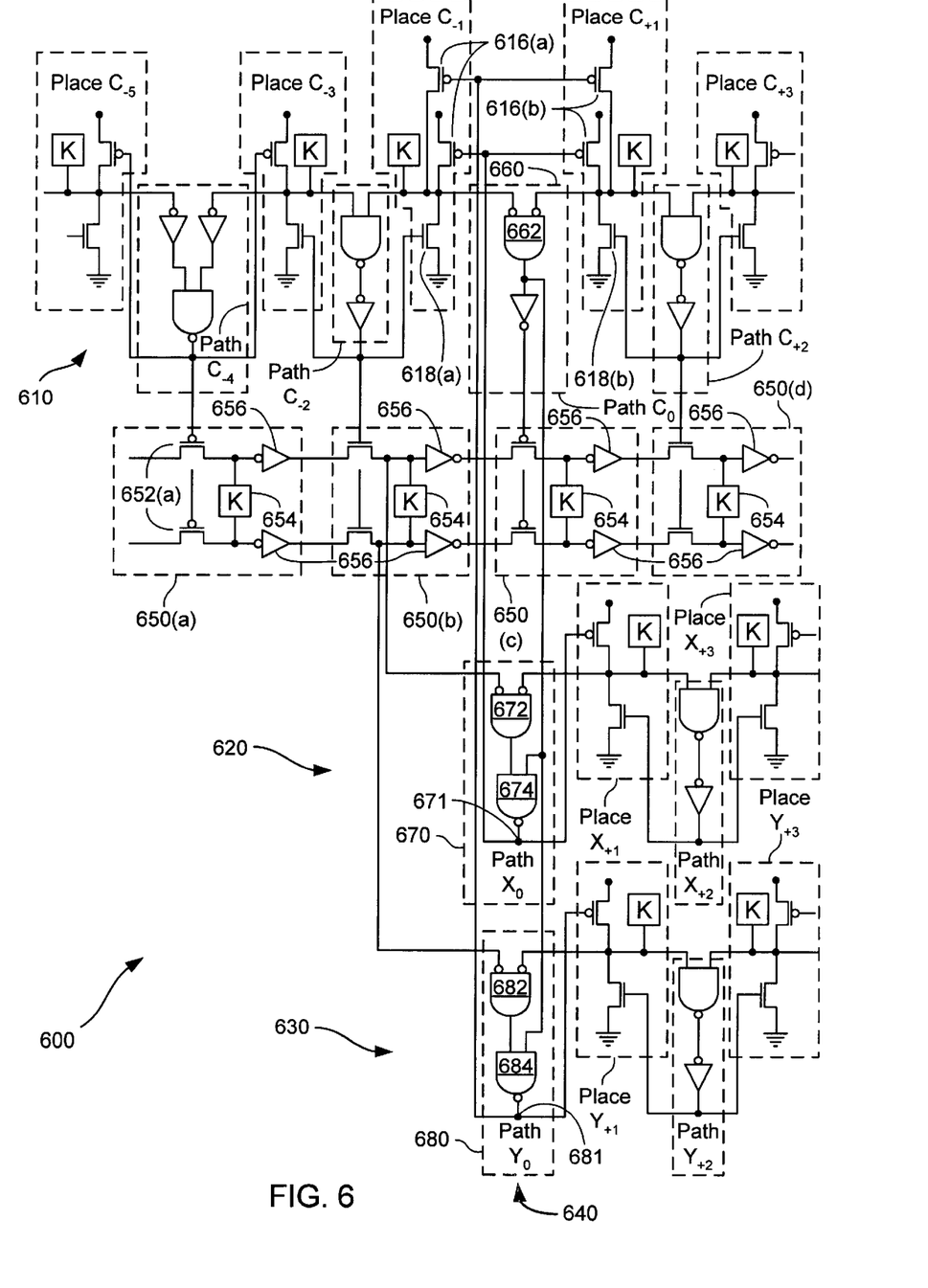
FIG. 6 is a schematic diagram of an embodiment of a P-type dynamic asP* of a branch circuit according to the present and invention.
Figure 7:
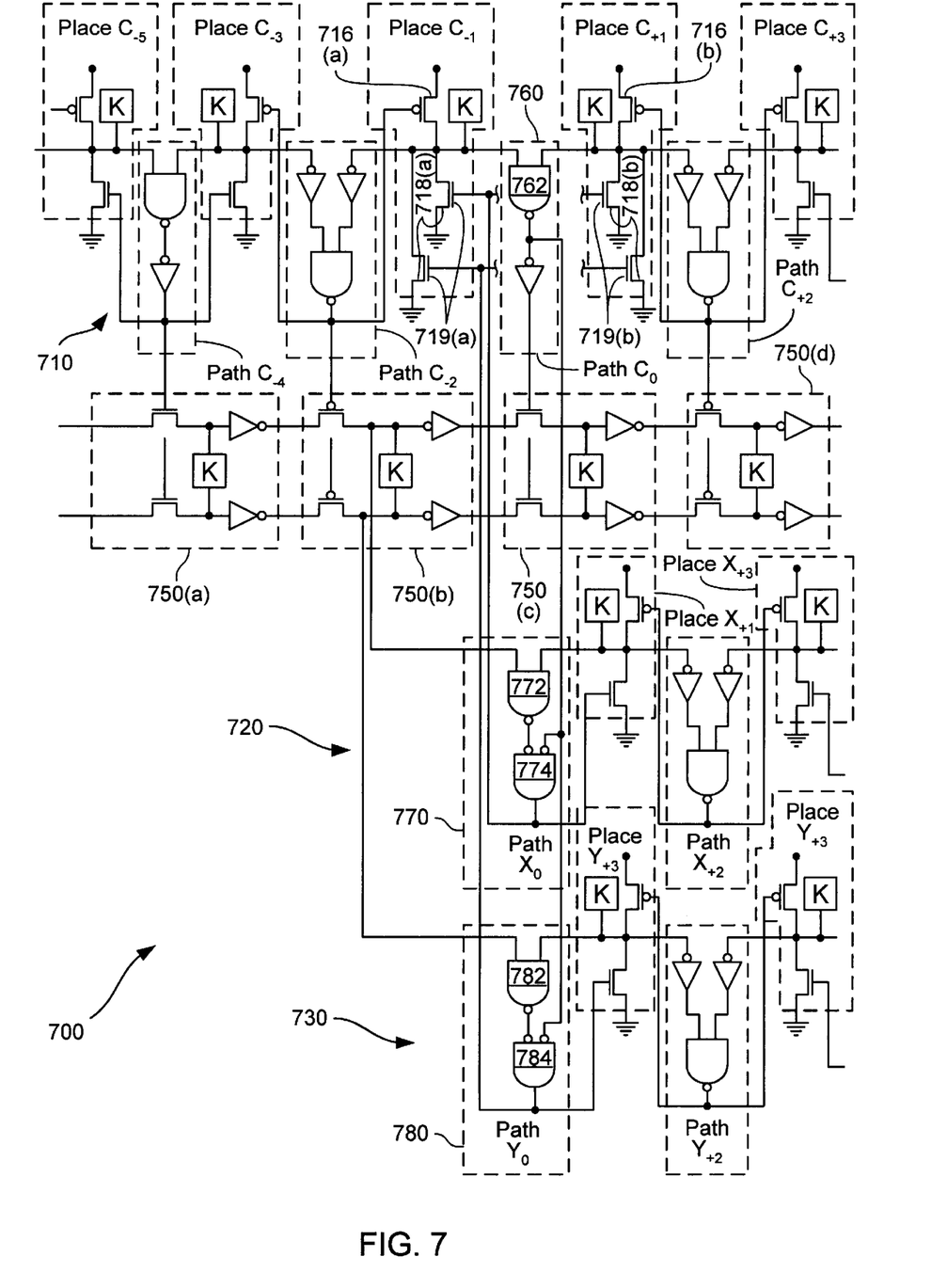
FIG. 7 is a schematic diagram of embodiment N-type dynamic asP* branch circuit of a of the present invention.
Figure 8:
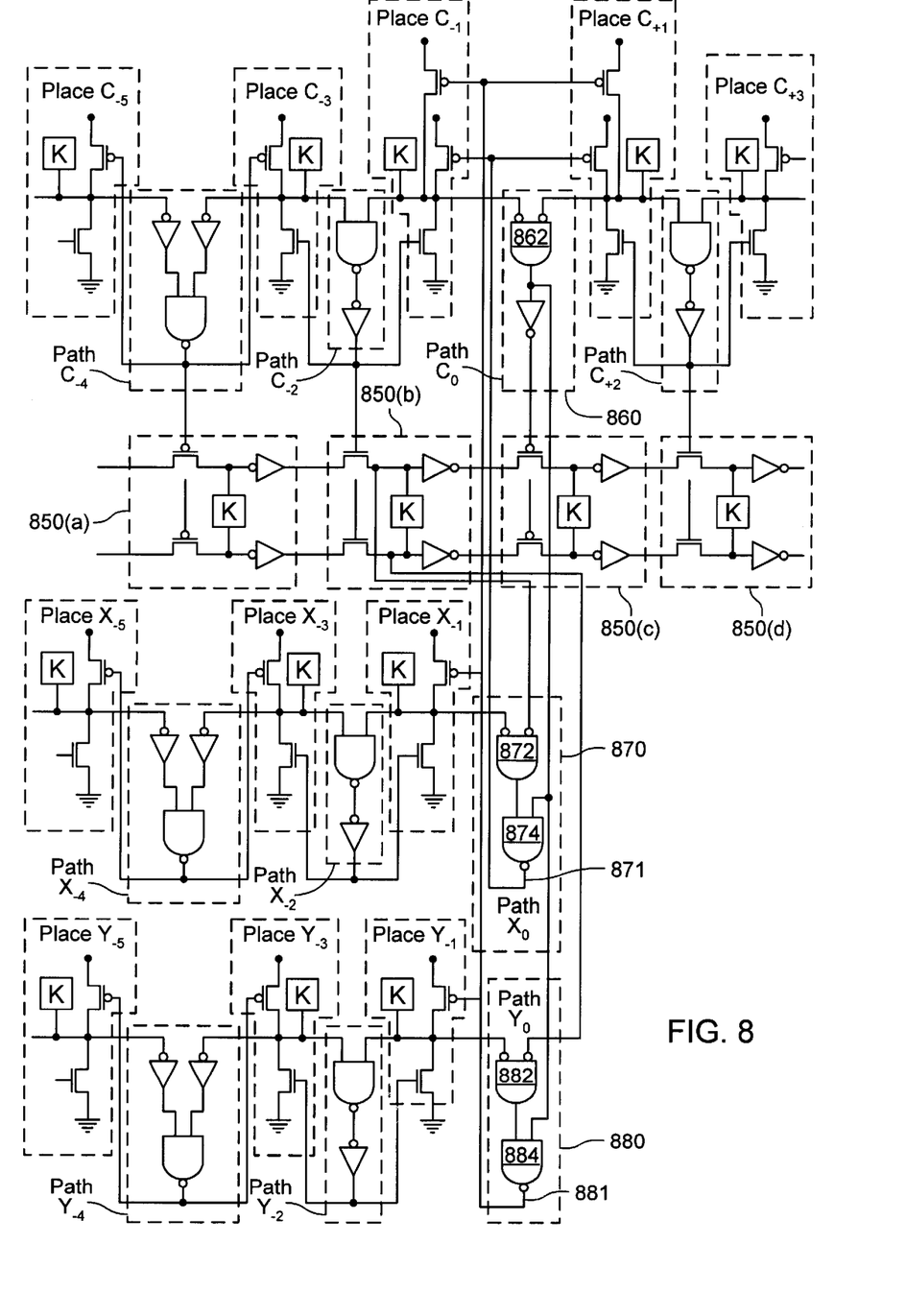
FIG. 8 is a schematic diagram of a P-type dynamic asP* join circuit of the present invention.
Figure 9:
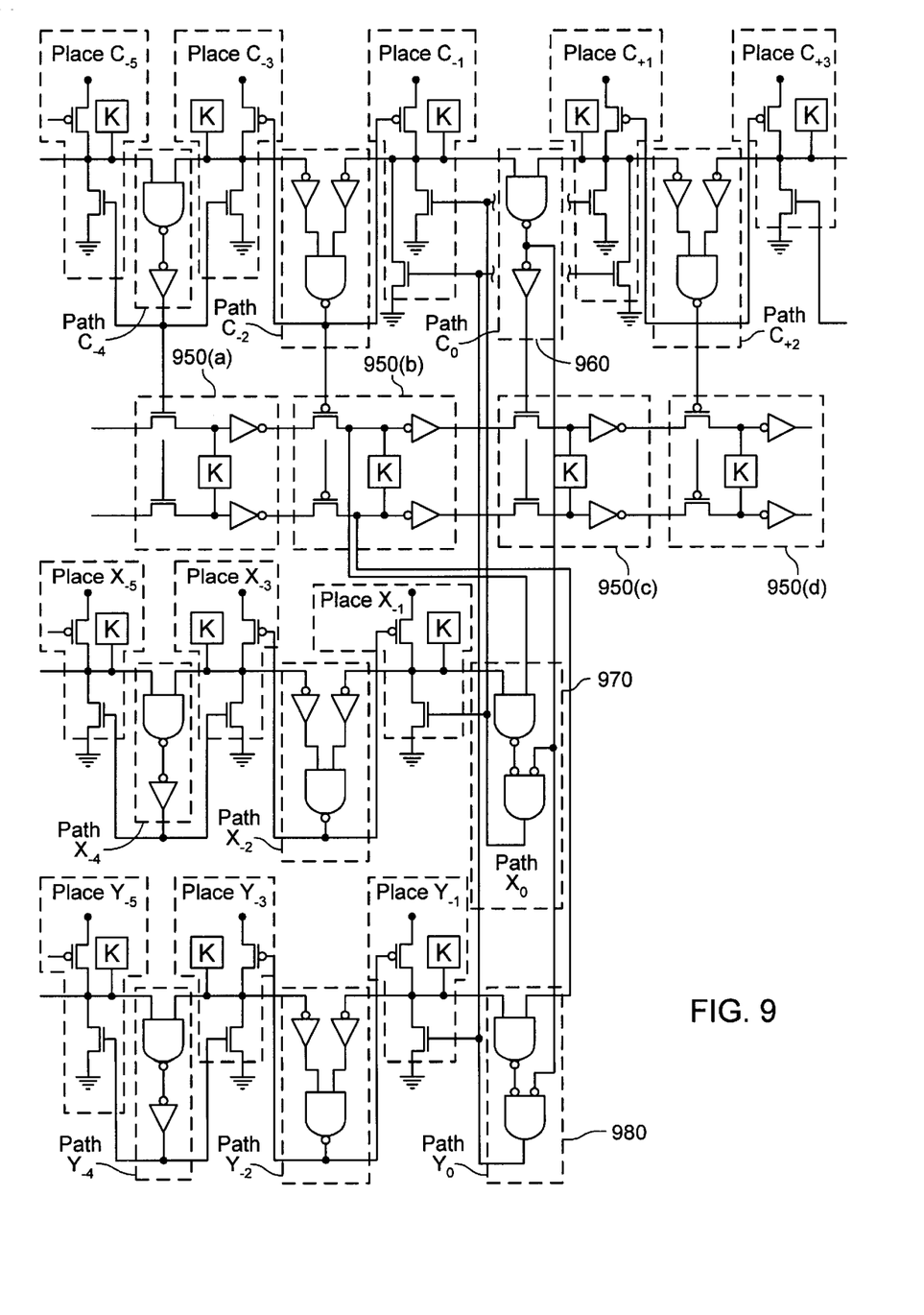
FIG. 9 is a schematic diagram an embodiment of an N-type dynamic asP* join circuit of the present invention.

Branch circuits 400 and join circuit 500 can be implemented using dynamic asP* FIFOs of the type shown in FIG. 2. FIGS. 6 and 7 show two kinds of branch circuits. FIGS. 8 and 9 show two kinds of join circuits. Two kinds of branches and joins are possible because there are two types of paths. The places and paths in the FIFOs in FIGS. 6, 7, 8 and 9 follow the same basic design as places 210(a)–(e) and paths 220(a)–(d) shown in FIFO 200 of FIG. 2.

For example, FIG. 6 depicts a portion of a P-type dynamic asP* branch circuit. The branch circuit 600 generally comprises control FIFO C 610, subordinate FIFO X 620, subordinate FIFO Y 630 and data latches 650(a)–(d). Data from input FIFO C 610 branches into output FIFO X 620 and output FIFO Y 630 at branch path 640. Branch path 640 contains paths $C_0$, $X_0$, and $Y_0$ represented by blocks 660, 670 and 680 respectively. FIFOs C, X and Y have several elements in common with FIFO 200 of FIG. 2. In particular FIFO s C, X and Y generally contain places that alternate between the HI=FULL type and the LO=FULL type. FIFOs C, X and Y also generally contain paths and data latches that alternate between P-type and N-type. Those skilled in the art will recognize that any number of places and paths in FIFO C could precede bifurcation path 640. Similarly any number of places and paths could succeed bifurcation path 640 in FIFOs C, X and Y.

Notice that places $C_{-1}$ and $C_{+1}$ just to the left and right of the bifurcation (i.e., branch) path 640 have two P-type transistors 616(a) 616(b), but only a single N-type transistor 618(a), 618(b). The two P-type transistors 616(a), 616(b) perform the logical OR function, rendering predecessor place $C_{-1}$ empty and successor place $C_{+1}$ full when either place $X_0$ or $Y_0$ acts.

Data latches 650(a)–(d) contain a pair of pass transistors followed by a latch keeper 654 and a pair of amplifying inverters 656. Data latches 650(*a*)–(*d*) are of alternate type. P-type latches 650(*a*), (*c*) use P-type pass transistors 652(*a*). N-type latches 650(*b*), (*d*) use N-type pass transistors 652(*b*). Although a particular form of data latch appears in FIG. 6, those skilled in the art will recognize that any of a number of data latch types could be used. Generally, FIFO's X and Y can chains of data latches analogous to data latches 650(*a*)–(*d*). Only the data latches associated with control FIFO C are shown in FIG. 6 for the sake of clarity.

In branch circuit 600 the elements in blocks 660, 670 and 680 of branch path 640 perform the four input AND function described in conjunction with FIG. 4. Blocks 660, 670 and 680 implement trees of two input AND functions (actually a pair of NOR gates) followed by a NAND gate. For example, the output 681 of path $Y_0$, i.e., block 680, comes from NAND gate 684 whose inputs come from NOR gates 682 and 662. NOR gate 662 of path $C_0$, i.e., block 660, detects the FULL, EMPTY combination of places $C_{-1}$ and $C_{+1}$. At the same time, NOR gate 682 in block 680 detects the EMPTY condition of place $Y_{+1}$ and the proper value of the data bit stored in keeper 654 of data latch 650(*b*). A similar four input AND function is implemented for the output 671 of path $X_0$ with NAND gate 674 whose inputs come from NOR gates 672 and 662. Because the four input AND functions of branch path 640 are built as balanced trees, the AND functions operate in only two gate delays. Thus, the speed of the system is maintained.

FIG. 7 depicts an N-type dynamic asP* branch circuit 700 generally comprising input FIFO C 710, output FIFO X 720, output FIFO Y 730, branch path 740 and data latches 750(*a*)–(*d*). Operation of branch circuit 700 is analogous to that of branch circuit 600 (shown in FIG. 6). Note however that places $C_{-1}$ and $C_{+1}$ have two N-type transistors 718(*a*), 718(*b*), but only a single P-type transistor 716(*a*), 716(*b*). The two N-type transistors 718(*a*), 718(*b*) perform the logical OR function analogous to that described above with respect to branch circuit 600. Note also that gates 719(*a*), 719(*b*) of transistors 718(*a*) and 718(*b*) are connected to each other as indicated by the cut away lines. Data latches 750(*a*)–(*d*) are of alternate type. Latches 750(*a*), (*c*) use N-type pass transistors 752(*a*) and latches 750(*b*), (*d*) use P-type pass transistors 752(*b*).

The elements in blocks 760, 770 and 780 of branch path 740 perform a four-input AND function analogous to that described in conjunction with FIG. 6. For example, the output 781 of path $Y_0$, i.e., block 780, comes from a NAND gate 784 whose inputs come from NOR gates 782 and 762. NOR gate 762 detects the FULL, EMPTY combination of places $C_{-1}$ and $C_{+1}$ while NOR gate 782 in block 780 detects the EMPTY condition of place $Y_{+1}$ and the value of the data bit stored in data latch 750(*b*). A similar four input AND function is implemented for the output 771 of path $X_0$ with NAND gate 774 and NOR gates 772 and 762.

FIG. 8 depicts a P-type dynamic asP* join circuit 800 generally comprising output FIFO C 810, input FIFO X 820, input FIFO Y 830, join path 840 and data latches 850(*a*), 850(*b*). Join circuit 800 has several elements in common with branch circuit 600. Note that places $C_{-1}$ and $C_{+1}$ have a construction and operation corresponding to that of places $C_{-1}$ and $C_{+1}$ branch circuit 600 of FIG. 6. Similarly, data latches 850(*a*)–(*d*) are analogous to data latches 650(*a*)–(*d*).

The elements in blocks 860, 870 and 880 of join path 840 perform a four input AND function that determines whether data from place $X_{-1}$ or place $Y_{-1}$ will be transferred to place $C_{+1}$. For example, the output 881 of path $Y_0$, i.e., block 880, comes from a NAND gate 884 whose inputs come from NOR gates 882 and 862. NOR gate 862 detects the FULL, EMPTY combination of places $C_{-1}$ and $C_{+1}$ while NOR gate 882 detects the FULL condition of place $Y_{-1}$ and the value of the data bit stored in data latch 850(*b*). A similar four input AND function is implemented for the output 871 of path $X_0$ with NAND gate 874 and NOR gates 872 and 862.

As with the branch circuits of FIGS. 6 and 7, FIFOs X and Y in join circuits 800 may generally contain chains of data latches analogous to data latches 850(*a*)–(*d*). Chains of data latches associated with FIFOs X and Y must be joined to the data latches of FIFO C.

Figure 8A:
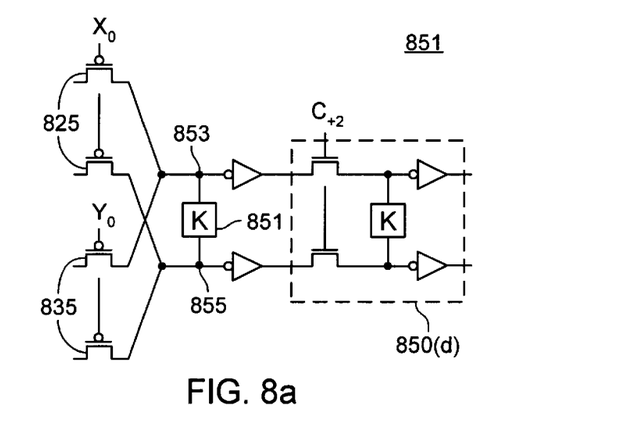
FIG. 8(a) is a schematic diagram and embodiment of a data latch circuit for a join circuit of the present invention.

FIG. 8(*a*) depicts a schematic of a suitable data latch circuit for join circuit 800. The data latch circuit 818 generally couples pass transistors 825, 835 of data latches in FIFOs X and Y to opposite nodes 853, 855 of a keeper 851. Nodes 853, 855 are coupled to inverters 857, 859. The inverters 857, 859 are coupled to neighboring data latch in FIFO C (e.g., data latch 850(*d*) in FIG. 8). Pass transistors 825 drive keeper 851 in response to pulses from path $X_0$. Pass transistors 835 drive keeper 851 in response to pulses from path $Y_0$. Paths $X_0$ and $Y_0$ can be coupled to pass transistors 825, 835 by either straight or buffered connections.

FIG. 9 depicts an N-type dynamic asP* join circuit 900 generally comprising output FIFO C 910, input FIFO X 920, input FIFO Y 930, join path 940 and data latches 950(*a*)–(*d*). Operation and construction of join circuit 900 is analogous to that of join circuit 800. Note that places $C_{-1}$ and $C_{+1}$ have a construction and operation generally corresponding to that of places $C_{-1}$ and $C_{+1}$ of branch circuit 700 in FIG. 7. Similarly, data latches 950(*a*)–(*d*) are analogous to data latches 750(*a*)–(*d*) branch circuit 700. Elements in blocks 960, 970 and 980 perform four-input AND functions similar to those described with respect to blocks 860, 870 and 880 of join circuit 800. Note that data latches in FIFOs X and Y of FIG. 9 can be joined in a manner similar to that depicted in FIG. 8(*a*).

Although particular forms of data latches, pulse generators and logic gates appear in FIGS. 6, 7, 8 and 9, those skilled in the art will recognize that any of a number of data latch and logic gate types could be used to implement the bifurcator circuits of the various embodiments of the present invention. For example, the pulse generators in the path circuits depicted in FIGS. 2, 6, 8 and 9 use a symmetric form of asP*, where forward and reverse paths through the pulse generator circuits contain the same latency (i.e., number of inversions). An asymmetric form of asP* (i.e., one with different latency in the forward and reverse paths) could also be used to generate the pulses in the paths.

Figure 10A:
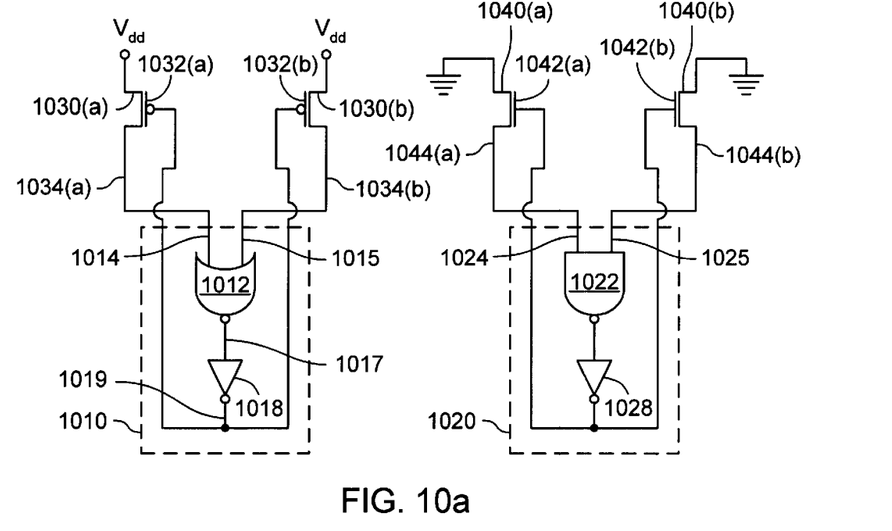
FIG. 10(a) is a schematic diagram depicting embodiments of symmetric pulse generators of the present invention.
Figure 10B:
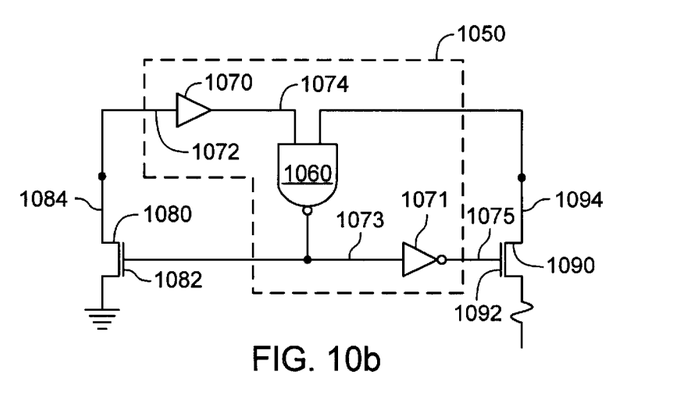
FIG. 10(b) is a schematic diagram depicting an embodiment of an asymmetric pulse generator of the present invention.

FIGS. 10(*a*) and 10(*b*) illustrate the difference between the two different forms of asP*. FIG. 10(*a*) depicts symmetric pulse generators 1010 and 1020. Pulse generator 1010 is an example of a path circuit that responds to a LO—LO condition in the neighboring places. Pulse generator 1020 is an example of a path circuit that responds to a HI—HI condition in the neighboring places. Pulse generator 1010 is coupled to P-type transistors 1030(*a*), 1030(*b*) and an N-type transistors 1040(*a*), such as those that would be found in neighboring places in a FIFO circuit.

Pulse generator 1010 generally includes a NOR gate 1012 coupled to an inverter 1018. NOR gate 1012 has inputs 1014, 1015 and an output 1016. Output 1016 is coupled to input 1017 of an inverter 1018. An output 1019 of inverter 1018 is coupled to gates 1032(*a*), 1032(*b*) of P-type transistors 1030(*a*), 1030(*b*). The inputs 1014, 1015 of NOR gate 1012 are coupled to drains 1034(*a*), 1034(*b*) of P-type transistors 1030(*a*), 1030(*b*). When a LO—LO condition is detected at the inputs 1014, 1015, NOR gate 1012 and inverter 1016 produce a pulse that drives gates 1032(*a*), 1032(*b*). Transistors 1030(*a*), 1030(*b*) then drive inputs 1014, 1015 HI, e.g., by coupling them to source voltage $V_{dd}$, shutting off the pulse. Note that a forward path, e.g., starting at drain 1034(*a*) and ending at drain 1034(*b*), involves three inversions and a reverse path between the same two points also involves three inversions.

Pulse generator 1020 operates in a similar fashion to pulse generator 1010. Pulse generator 1020 generally includes a NAND gate 1022 coupled to an inverter 1028. Inverter 1028 is coupled to gates 1042(*a*), 1042(*b*) of N-type transistors 1040(*a*), 1040(*b*). Inputs 1024, 1025 of NAND gate 1022 are coupled to drains 1044(*a*), 1044(*b*) of N-type transistors 1040(*a*), 1040(*b*). When a HI—HI condition is detected at inputs 1024, 1025, NAND gate 1022 and inverter 1028 produce a pulse that makes transistors 1040(*a*), 1040(*b*) transparent and drives inputs 1024, 1025 LO, e.g., by coupling them to ground, shutting off the pulse. Those skilled in the art will recognize that forward and reverse paths through pulse generator 1020 involve the same number of inversions.

FIG. 10(*b*) illustrates an asymmetric asP* pulse generator suitable for use in a path circuit in the various embodiments of the present invention. The pulse generator 1050 generally comprises a NAND gate 1060 and two inverters 1070 and 1071. Pulse generator circuit 1050 is typically coupled to transistors 1080, 1090 such as those that would be found in places neighboring a path circuit in a FIFO. Drain 1084 of transistor 1080 is coupled to input 1072 of inverter 1070. Output 1074 of inverter 1070 is coupled to input 1062 NAND gate 1060. Output 1064 of NAND gate 1060 is coupled gate 1082 of transistor 1080 and input 1073 of inverter 1071. Output 1075 of inverter 1071 is coupled to gate 1092 of transistor 1090. Drain 1094 of transistor 1090 is coupled to input 1066 of NAND gate 1060.

When a HI—HI (or a LO—LO depending on the type of transistors used) condition is detected at drains 1084, 1094, NAND gate 1060 and inverters 1070, 1071 produce pulses that drive the gates 1082, 1092 of transistors 1080, 1090 and, shuts off the pulse. Those skilled in the art will recognize that a forward path through pulse generator 1050 involves four inversions while a reverse path involves only three inversions. Notice that for both the symmetric and asymmetric pulse generators, the last of the logic gates in the forward and reverse paths is a single transistor and not a complete gate. This makes the circuit operate very much faster than the earlier asP* implementations.

In addition to greater speed, the bifurcation circuits described above exhibit several other advantages. First, they can be "single rail" systems. This enables a single wire handshaking scheme in which one wire is used to send both the "request" of the preceding stage and the "acknowledge" of the succeeding stage. Second, the data latches, such as those in FIG. 2, are normally opaque, i.e., non-conducting. As such the power consumption of FIFO circuit 200 is reduced because the output voltage of data latches 230(*a*)–(*d*) changes only when it must in response to capturing a new data value. Systems in which the data latches are normally transparent (i.e., conducting) can consume power sending unneeded charges through the transparent data logic prior to capturing a necessary value. Third, the bifurcator circuits described herein involve relatively few transistors. Having fewer transistors leads to compact layout and low power consumption.

Fourth, the pulses produced in the bifurcator circuits are much like the clock pulses of conventional synchronous pulse driven circuits. For example, although data latches of the bifurcator circuits described herein operate asynchronously with respect to each other, they are driven by pulses of known duration and known minimum spacing. Thus the design of logical and arithmetic circuits for these asynchronous pulse bifurcator circuits is very much like the more familiar design task of logical and arithmetic circuits for similar synchronous circuits.

The bifurcator circuits of the embodiments of the present invention may be used in many types of digital circuits and systems, for example, computer systems or microprocessors. Although the bifurcator circuits depicted and described herein bifurcate three FIFOs at the bifurcation path, those skilled in the art will be able to devise bifurcator circuits that bifurcate four or more FIFOs using, for example, a "switch fabric" having multiple bifurcation paths. Furthermore, the bifurcation circuits described herein can be generalized to circuits containing $2^n$ subordinate FIFOs, where n is an integer greater than or equal to one.

What is claimed is:

1. An asynchronous bifurcator circuit, comprising:
   a control FIFO containing a first plurality of places and a first plurality of paths;
   first subordinate asynchronous FIFO containing a second plurality of places and a second plurality of paths;
   a second subordinate asynchronous FIFO containing a third plurality of places and a third plurality of paths; and
   a bifurcation path coupled to said control FIFO and said first and second subordinate FIFOs, wherein said bifurcation path is configured such that if said control value is a first value of two possible values, said bifurcation path moves said data value to a successor place in said first subordinate FIFO and if said data value is a second value of said two possible values, said bifurcator moves said data value to a successor place in said second subordinate FIFO.

2. The asynchronous bifurcator circuit of claim 1 wherein said first and second subordinate FIFOs are part of a plurality of $2^n$ FIFOs where n is an integer greater than one.

3. An asynchronous bifurcator circuit comprising:
   a control FIFO containing a first plurality of places and a first plurality of paths;
   a first subordinate asynchronous FIFO containing a second plurality of places and a second plurality of paths;
   a second subordinate asynchronous FIFO containing a third plurality of places and a third plurality of paths; and
   a bifurcation path coupled to said control FIFO and said first and second subordinate FIFOs, wherein each place in said control FIFO and each place in said first and second subordinate FIFOs is coupled to a respective set-reset flip-flop and a respective keep.

4. The asynchronous bifurcator circuit of claim 3, wherein a single transistor sets or resets said set-reset flip-flop.

5. The asynchronous bifurcator circuit of claim 3, further comprising at least one data latch coupled to said bifurcation path at least one path of said first, second and third plurality of paths.

6. The asynchronous bifurcator circuit of claim 5 arranged such that a pulse that changes a state of said set-reset flip-flop also makes said at least one data latch transparent.

7. An asynchronous bifurcator circuit comprising:
   a control FIFO containing a first plurality of places and a first plurality of paths;

a first subordinate asynchronous FIFO containing a second plurality of places and a second plurality of paths;

a second subordinate asynchronous FIFO containing a third plurality of places and a third plurality of paths; and a bifurcation path coupled to said control FIFO and said first and second subordinate FIFOs, wherein at least one path in said first, second and third pluralities of paths includes an asymmetric pulse generator.

8. The asynchronous bifurcator circuit of claim 1, wherein said control FIFO is configured such that a control value is stored in said control FIFO determines which of said first or second subordinate FIFOs exchanges data with said control FIFO.

9. The asynchronous bifurcator circuit of claim 1, wherein said bifurcation path is configured such that said bifurcation path moves said data value from a predecessor place to a successor place when said predecessor place is in a first state and said successor place is in a second state.

10. The asynchronous bifurcator circuit of claim 1, wherein said bifurcation path is configured such that if said control value is a first value of two possible values, said bifurcation path moves a data value from a predecessor place in said first subordinate FIFO to a successor place in said control FIFO and if control value is a second value of said two possible values, said bifurcation path moves a data value from a predecessor place in said second subordinate FIFO to a successor place in said control FIFO.

11. The asynchronous bifurcator circuit of claim 11, wherein at least one of said places in said first, second and third plurality of places is coupled at a node to a drain of an N-type transistor and a drain of a P-type transistor.

12. The asynchronous bifurcator circuit of claim 11 wherein said node is coupled to at least one neighboring path, said neighboring place including an inverter having an input and an output, and a NAND gate having a first input, a second input and an output, said input of said inverter being coupled to said node, said output of said inverter being coupled to at least one of said first and second inputs of said NAND gate said output of said NAND gate being coupled to a gate electrode of said P-type transistor.

13. The asynchronous bifurcator circuit of claim 11 wherein said node is coupled to at least one neighboring path, said neighboring place including an a NAND gate having a first input, a second input and an output and an inverter having an input and an output, at least one of said first and second inputs of said NAND gate being coupled to said node, said output of said NAND gate being coupled said input of said inverter, said output of said inverter being coupled to a gate electrode of said N-type transistor.

14. The asynchronous bifurcator circuit of claim 13, wherein at least one of said paths in said first, second and third plurality of paths includes a NAND gate that is coupled to an inverter.

15. The asynchronous bifurcator circuit of claim 13, further comprising:

at least one data latch coupled to said at least one of said paths.

16. The asynchronous bifurcator circuit of claim 15 wherein said data latch includes a pair of transistors coupled to a keeper, at least one transistor of said pair of transistors having a gate coupled to an output of said at least one path.

17. A method for asynchronously bifurcating streams of data, comprising:

providing a control FIFO providing a first subordinate asynchronous FIFO providing a second subordinate asynchronous FIFO containing a third plurality of places and a third plurality of paths; and asynchronously exchanging data between said control FIFO and said first and second subordinate FIFOs, wherein a control value carried in said control FIFO determines which of said first or second subordinate FIFOs exchanges data with said control FIFO wherein a bifurcation path moves a data value from a predecessor place to a successor place when said predecessor place is full and said successor place is empty and wherein if said control value is a first value of two possible values, said bifurcation path moves said data value to a successor place in said first subordinate FIFO and if said data value is a second value of said two possible values, said bifurcator moves said data value to a successor place in said second subordinate FIFO.

18. A method for asynchronously bifurcating streams of data, comprising:

providing a control FIFO providing a first subordinate asynchronous FIFO providing a second subordinate asynchronous FIFO containing a third plurality of places and a third plurality of paths; and asynchronously exchanging data between said control FIFO and said first and second subordinate FIFOs, wherein a control value carried in said control FIFO determines which of said first or second subordinate FIFOs exchanges data with said control FIFO wherein a bifurcation path moves a data value from a predecessor place to a successor place when said predecessor place is full and said successor place is empty and wherein if said control value is a first value of two possible values, said bifurcation path moves a data value from a predecessor place in said first subordinate FIFO to a successor place in said control FIFO and if control value is a second value of said two possible values, said bifurcation path moves a data value from a predecessor place in said second subordinate FIFO to a successor place in said control FIFO.

* * * * *